United States Patent
Cross, III et al.

(10) Patent No.: US 9,922,025 B2
(45) Date of Patent: *Mar. 20, 2018

(54) GENERATING DISTRIBUTED WORD EMBEDDINGS USING STRUCTURED INFORMATION

(71) Applicant: INTERNATIONAL BUSINESS MACHINES CORPORATION, Armonk, NY (US)

(72) Inventors: James H. Cross, III, Astoria, NY (US); James J. Fan, Mountain Lakes, NJ (US); Bing Xiang, Mount Kisco, NY (US); Bowen Zhou, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,303

(22) Filed: Aug. 8, 2017

(65) Prior Publication Data

US 2017/0337183 A1 Nov. 23, 2017

Related U.S. Application Data

(63) Continuation of application No. 15/182,016, filed on Jun. 14, 2016, which is a continuation of application No. 14/707,885, filed on May 8, 2015.

(51) Int. Cl.
*G06F 17/27* (2006.01)
*G06F 17/30* (2006.01)

(52) U.S. Cl.
CPC ........ *G06F 17/2785* (2013.01); *G06F 17/271* (2013.01); *G06F 17/30731* (2013.01)

(58) Field of Classification Search
None
See application file for complete search history.

(56) References Cited

U.S. PATENT DOCUMENTS 6,029,195 A * 2/2000 Herz ................. G06F 17/30867
348/E7.056
6,874,432 B2 4/2005 Lanphear
(Continued)

FOREIGN PATENT DOCUMENTS

WO PCT-2013091075 A1 6/2013

OTHER PUBLICATIONS

IBM, Appendix P, List of IBM Patents or Patent Applications Treated as Related, dated Aug. 8, 2017, 2 pages.
Collobert R. et al.; "Natural Language Processing (Almost) from Scratch"; Journal of Machine Learning Research 12 (2011) 2493-2537; Submitted Jan. 2010; Revised Nov. 2010; Published Aug. 2011; © 2011, Ronan Collobert, Jason Weston, Leon Bottou, Michael Karlen, Koray Kavukcuoglu and Pavel Kuksa.
(Continued)

*Primary Examiner* — Kevin Ky
(74) *Attorney, Agent, or Firm* — William H. Hartwell

(57) ABSTRACT

A computer program that generates a vector representation of a set of natural language text in a natural language processing system by: (i) receiving a first set of natural language text and a set of information pertaining to the first set of natural language text, where the information includes a dependency parse tree including a root node and a plurality of nodes that depend from the root node, where the root node represents the first set of natural language text, and where the plurality of nodes that depend from the root node represent context features of the first set of natural language text; and (ii) generating, by the natural language processing system, a first vector representation of the first set of natural language text, wherein the generating includes adding vector representations for the context features represented by the plurality of nodes that depend from the root node.

20 Claims, 4 Drawing Sheets

(56) References Cited

U.S. PATENT DOCUMENTS

| | | | | |
|---|---|---|---|---|
| 7,251,637 | B1* | 7/2007 | Caid | G06F 17/30256 706/15 |
| 8,346,791 | B1* | 1/2013 | Shukla | G06F 17/30864 707/759 |
| 8,682,907 | B1* | 3/2014 | Yang | G06F 7/02 707/706 |
| 8,874,432 | B2 | 10/2014 | Qi | |
| 9,318,108 | B2* | 4/2016 | Gruber | G10L 15/1815 |
| 9,672,814 | B2 | 6/2017 | Cao et al. | |
| 2003/0200077 | A1* | 10/2003 | Leacock | G06F 17/30684 704/1 |
| 2006/0129383 | A1* | 6/2006 | Oberlander | G06F 17/274 704/10 |
| 2012/0150531 | A1 | 6/2012 | Bangalore | |
| 2012/0158398 | A1 | 6/2012 | Denero | |
| 2012/0246176 | A1* | 9/2012 | Takamatsu | G06F 17/278 707/749 |
| 2012/0253785 | A1 | 10/2012 | Hamid | |
| 2013/0173247 | A1* | 7/2013 | Hodson | G06F 17/28 704/4 |
| 2013/0275164 | A1* | 10/2013 | Gruber | G10L 17/22 705/5 |
| 2013/0339002 | A1* | 12/2013 | Wakui | G06F 17/2795 704/9 |
| 2014/0052444 | A1* | 2/2014 | Roberge | G10L 15/08 704/243 |
| 2014/0067368 | A1* | 3/2014 | Yih | G06F 17/30672 704/9 |
| 2014/0184607 | A1* | 7/2014 | Toyoshima | G06F 17/2765 345/440 |
| 2014/0324808 | A1* | 10/2014 | Sandhu | G06F 17/2785 707/706 |
| 2014/0350964 | A1* | 11/2014 | Rhodes | G06F 19/327 705/3 |
| 2015/0019382 | A1* | 1/2015 | Shinzato | G06F 17/30 705/26.63 |
| 2015/0161109 | A1* | 6/2015 | Talbot | G06F 17/271 704/2 |
| 2015/0227505 | A1* | 8/2015 | Morimoto | G06F 17/2785 704/9 |
| 2015/0286710 | A1* | 10/2015 | Chang | G06F 17/30705 706/12 |
| 2016/0307566 | A1 | 10/2016 | Bellegarda | |
| 2016/0328383 | A1 | 11/2016 | Cross, III | |
| 2016/0328386 | A1 | 11/2016 | Cross, III | |
| 2016/0364378 | A1 | 12/2016 | Futrell et al. | |

OTHER PUBLICATIONS

Hofford, G.; "Structure Logic: A New Method that Enables Richer Meaning Representations"; An IP.com Prior Art Database Technical Disclosure; IP.com No. 000235703; IP.com Electronic Publication: Mar. 21, 2014; Copyright 2014 Glenn Hofford; pp. 1-447.

Hu et al.; "Convolutional Neural Network Architectures for Matching Natural Language Sentences"; Hangli-hl; in Proceedings of Advances in Neural Information Processing Systems 27 (NIPS); 2014; [online]; 9 pages; <http://www.hangl i-hl.com/uploads/3/1/6/8/3168008/hu-etal-nips2014. pdf>.

Huang et al.; "Improving Word Representations via Global Context and Multiple Word Prototypes"; Stanford; in Proceedings of the Association for Computational Linguistics 2012 Conference (ACL '12); [online] <http://nlp.stanford.edu/pubs/HuangACL 12.pdf>.

Lee et al.; "Pseudo-Label : The Simple and Efficient Semi-Supervised Learning Method for Deep Neural Networks"; ICML 2013 Workshop: Challenges in Representation Learning (WREPL); Atlanta, Georgia, USA; Copyright 2013 by the author(s); [online]; <http://deeplearning.net/wp-content/uploads/2013/03/pseudo_1 abel_final .pdf>.

Luong et al.; "Better Word Representations with Recursive Neural Networks for Morphology"; [online] <http://nlp.stanford. eduHmthang/data/papers/conll13_morpho.pdb; 10 pages.

Mikolov, T. et al.; "Distributed Representations of Words and Phrases and their Compositionality"; Proceedings of NIPS 2013; pp. 1-9.

Rajkumar et al.; "Paraphrase Recognition using Neural Network Classification"; © 2010 International Journal of Computer Applications (0975-8887); vol. 1—No. 29; pp. 42-47; [online] <http://citeseerx.ist.psu.edu/viewdoc/summary?doi =10.1.1.206.4557>.

Shinyama et al.; "Paraphrase Acquisition for Information Extraction"; Proceedings of the second international Norkshop on Paraphrasing; vol. 16; pp. 65-71.

Socher, R. et al.; "Parsing Natural Scenes and Natural Language with Recursive Neural Networks"; Appearing in Proceedings of the 28th International Conference on Machine Learning; Bellevue, WA, USA, 2011; Copyright 2011; 8 pages.

Weston et al.; Deep Learning via Semi-Supervised Embedding; Proceedings of the 25th International Conference on Machine Learning; Helsinki, Finland; 2008; Copyright 2008 by the author(s)/owner(s); 8 pages; [online].

Zeng et al.; "Relation Classification via Convolutional Deep Neural Network"; License under a Creative Commons Attribution 4.0 International License; [online]; 8 pages; <http:/www.nlpr.ia.ac.cn/cip/liukang.files/coling2014.pdf>.

* cited by examiner

| | Word/Phrase | Context Feature |
|---|---|---|
| R710 | receive | mod_vprep_in>1921 |
| R720 | 1921 | mod_vprep_in<receive |
| R730 | receive | subj>Einstein |
| R740 | Einstein | subj<receive |
| R750 | receive | obj>Nobel_prize |
| R760 | Nobel_prize | obj<receive |

US 9,922,025 B2

GENERATING DISTRIBUTED WORD EMBEDDINGS USING STRUCTURED INFORMATION

BACKGROUND

The present invention relates generally to the field of natural language processing, and more particularly to learning word embeddings for determining similarity between words and phrases.

Natural language processing (NLP) is a field of computer science, artificial intelligence, and linguistics that, amongst other things, is concerned with using computers to derive meaning from natural language text. NLP systems may perform many different tasks, including, but not limited to, determining the similarity between certain words and/or phrases. One known way to determine the similarity between words and/or phrases is to compare their respective word embeddings. A word embedding is a mapping of natural language text to a vector of real numbers in a continuous space (and is also sometimes referred to as a "vector representation"). Generally speaking, the word embeddings of similar words are located close to each other in the continuous space.

SUMMARY

According to an aspect of the present invention, there is a method, computer program product, and/or system for generating a vector representation of a set of natural language text in a natural language processing system, where the method, computer program product, and/or system performs the following steps (not necessarily in the following order): (i) receiving, by the natural language processing system, a first set of natural language text and a set of information pertaining to the first set of natural language text, where the information includes a dependency parse tree including a root node and a plurality of nodes that depend from the root node, where the root node represents the first set of natural language text, and where the plurality of nodes that depend from the root node represent context features of the first set of natural language text; (ii) generating, by the natural language processing system, a first vector representation of the first set of natural language text, wherein the generating includes adding vector representations for the context features represented by the plurality of nodes that depend from the root node; and (iii) comparing, by the natural language processing system, the generated first vector representation to a second vector representation to determine, in the natural language processing system, an amount of similarity between the first set of natural language text and a second set of natural language text represented by the second vector representation.

DETAILED DESCRIPTION

Figure 1:
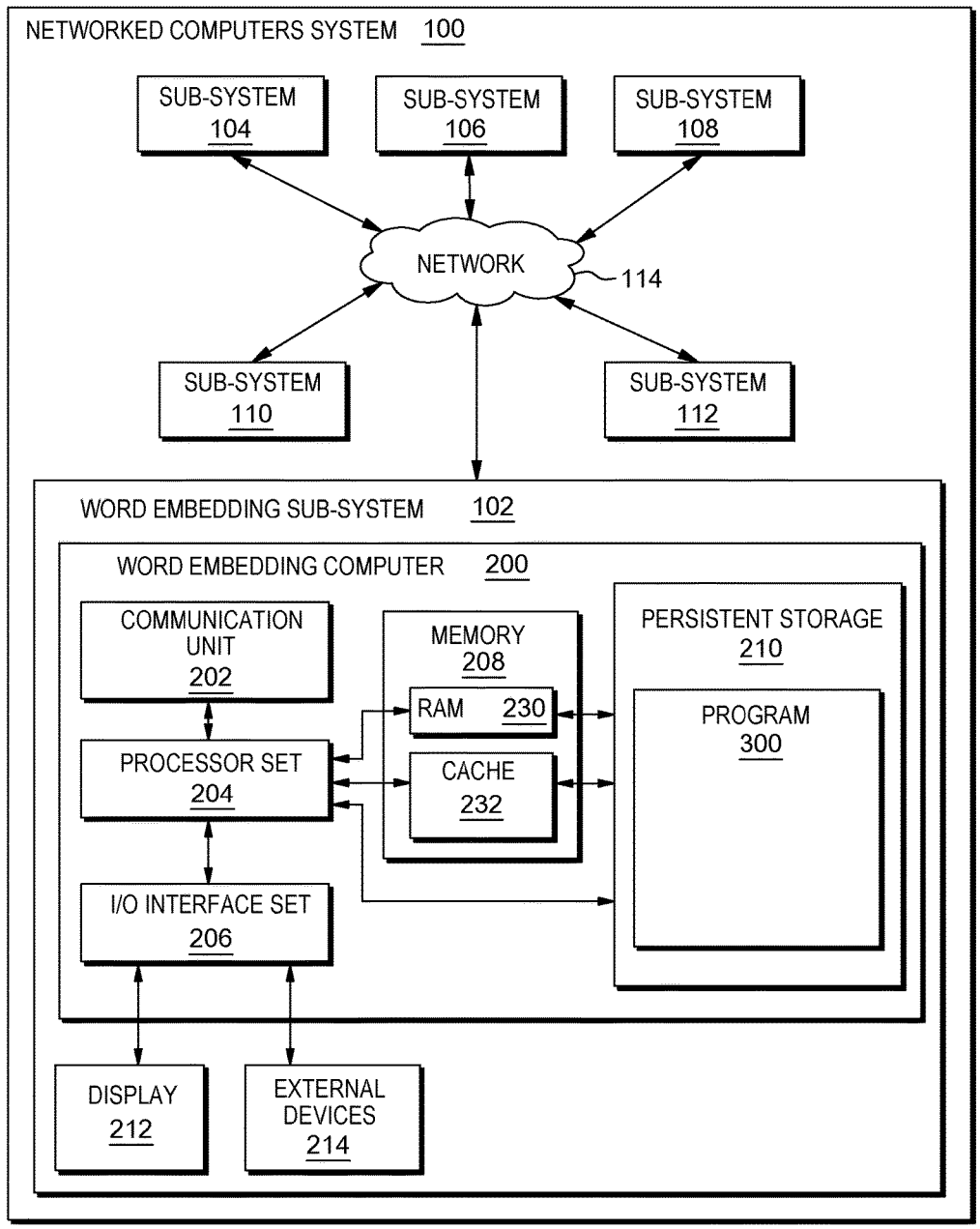
FIG. 1 is a block diagram view of a first embodiment of a system according to the present invention.

In natural language processing (NLP), it can be helpful to represent natural language text as vectors in order to determine similarity by comparing vector representations in a continuous space. However, representing words and phrases as vectors (also referred to as "word embedding") can be a difficult task, with each known method having its own drawbacks. Embodiments of the present invention use structured information, such as syntactic and semantic information, as context for representing words and/or phrases as vectors, while prior art methods only include using adjacent words (and not structured information) to create word embeddings. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: word embedding sub-system 102; word embedding sub-systems 104, 106, 108, 110, 112; communication network 114; word embedding computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention (including, for example, sub-systems 104, 106, 108, 110 and 112). Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with word embedding computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
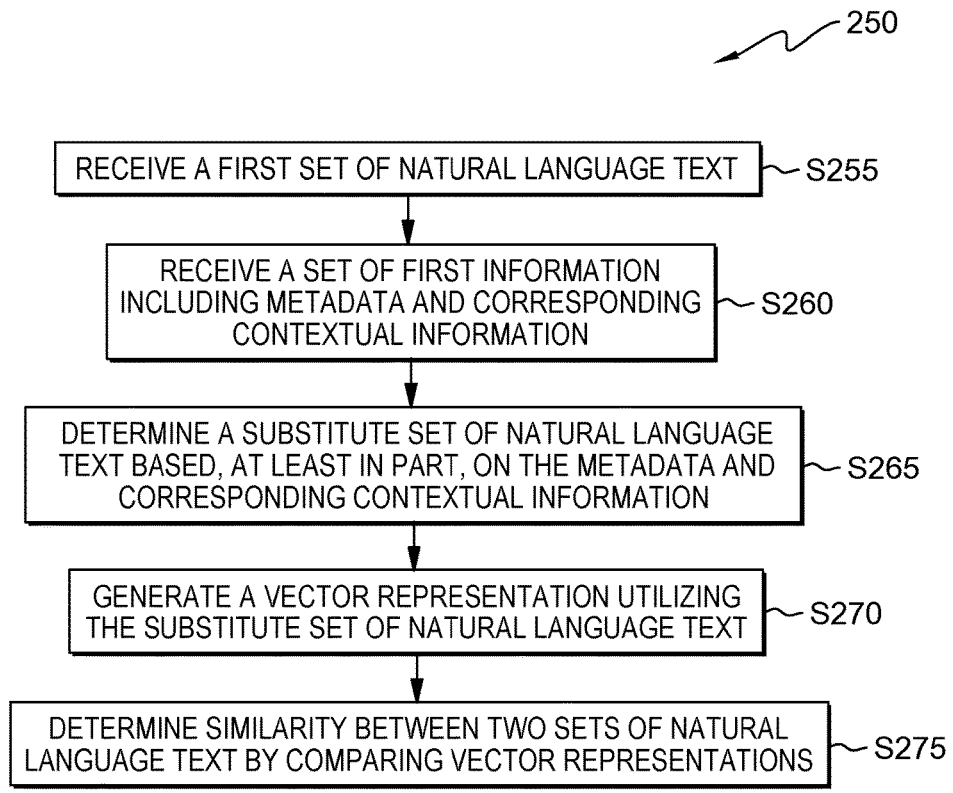
FIG. 2 is a flowchart showing a first embodiment method performed, at least in part, by the first embodiment system.
Figure 3:
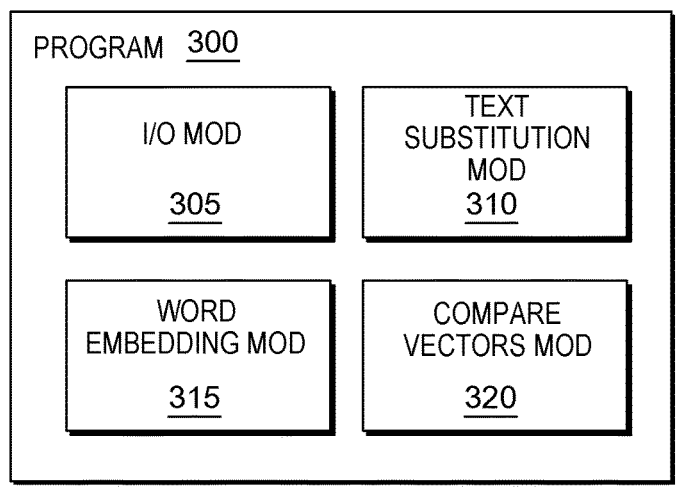
FIG. 3 is a block diagram showing a machine logic (for example, software) portion of the first embodiment system.

FIG. 2 shows flowchart 250 depicting a method (sometimes also referred to as method 250) according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). It should be noted that the current example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section. Furthermore, although program 300 is depicted as residing in persistent storage 210 on word embedding computer 200 of word embedding sub-system 102 (see FIG. 1), it should be understood that in other embodiments, all or part of program 300 may reside in word-embedding sub-systems 104, 106, 108, 110, 112, or elsewhere.

One way to determine similarity between words and/or phrases in a natural language processing (NLP) system is to compare vector representations of those words and/or phrases. As stated above, embodiments of the present invention (including the present example embodiment) generate vector representations for natural language text using metadata and contextual information (where the combination of metadata and contextual information is sometimes referred to as "structure information" and the combination of structure information and natural language text is sometimes referred to as "structured information").

Processing begins at step S255, where input/output ("I/O") module ("mod") 405 receives a first set of natural language text. The received first set of natural language text is the text for which method 250 will generate vector representations (or "word embeddings"). Generally speaking, the set of natural language text may include any natural language text that is capable of being represented by a vector. In some embodiments, the set of natural language text includes a single word or phrase. In other embodiments, the set of natural language includes an entire document (such as an article or a book). In still other embodiments, the set of natural language text includes a large collection of documents and/or other textual content, including, but not limited to, the entire collection of data available via the World Wide Web. In the present example embodiment, which will be discussed throughout this sub-section, the set of natural language text is a single sentence of text: "The quick brown fox jumps over the lazy dog."

Processing proceeds to step S260, where I/O mod 305 receives a set of first information pertaining to the first set of natural language text, where the first information includes structure information (and where the first information combined with the first set of natural language text is considered "structured information"). In many embodiments (including the present example embodiment), the first information (that is, the structure information) includes metadata and corresponding contextual information indicating a relationship between the metadata and the first set of natural language text. However, that is not always the case. As used herein, structure information is any information that includes metadata for the first set of natural language text (for a definition of "metadata," see the Definitions sub-section of this Detailed Description).

In the present example embodiment, the metadata includes words that are synonyms of some of the words in the received first set of natural language text, and the corresponding contextual information indicates that the words in the metadata are, in fact, synonyms of the respective words in the first set of natural language text. More specifically, the first information in the present example embodiment includes metadata and contextual information for the following words in the received first set of natural language text:

| Metadata and Contextual Information Received by Mod 305 | | |
| --- | --- | --- |
| Original Word | Metadata | Contextual Information |
| quick | fast | synonym |
| jumps | leaps | synonym |
| lazy | passive | synonym |
| fox | canine | synonym |
| dog | canine | synonym |

In certain embodiments, the contextual information corresponding to the metadata indicates a syntactic relationship between the metadata and the first set of natural language text. A syntactic relationship is any relationship relating to the structure of natural language phrases and sentences (for a Definition of "syntactic," see the Definitions sub-section of this Detailed Description). In one embodiment, the contextual information includes a constituent parse tree, where the tree structure is the contextual information, and parts of speech (for example—nouns and verbs) are the metadata. In another embodiment, the contextual information includes a dependency parse tree, where (again) the tree structure itself serves as the contextual information, and the parts of speech (located in the tree "nodes") are the metadata. For a discussion of an example dependency parse tree according to an embodiment of the present invention, see the discussion of FIG. 6 in the Further Comments and/or Embodiments sub-section of this Detailed Description, below.

In certain embodiments, the contextual information corresponding to the metadata indicates a semantic relationship between the metadata and the first set of natural language text. A semantic relationship is any relationship relating to the meaning of natural language text (for a definition of "semantic," see the Definitions sub-section of this Detailed Description). In some embodiments, the metadata includes a named entity type of at least a portion of the first set of natural language text. For example, in one embodiment, the metadata includes the word "Person", which is a named entity type (with contextual information of "named entity type") of the words "computer programmer." In another embodiment, the metadata includes the word "Place", which is a named entity type (with contextual information of "named entity type") of the word "Paris," for example. In other (or the same) embodiments, the metadata may include other types of semantic information. For example, as discussed above, in the present example embodiment, the metadata includes synonyms of some of the words included in the first set of natural language text (where the corresponding contextual information indicates that the words are, in fact, synonyms).

Processing proceeds to step S265, where text substitution mod 310 determines one or more substitute set(s) of natural language text based, at least in part, on the metadata and its corresponding contextual information. In some embodiments, the substitute sets of natural language text do not include the first set of natural language text (or portions thereof). For an example of one of these embodiments, see the discussion of FIGS. 6 and 7, below (in the Further Comments and/or Embodiments sub-section of this Detailed Description). In the example discussed below in relation to FIGS. 6 and 7, the words in the first set of natural language text (see column 702 in table 700) are replaced by completely new substitute text ("context features", see column 704 in table 700). However, this is not always the case. In some embodiments (including the present example embodiment), the substitute set(s) of natural language text include the first set of natural language text (or portions thereof). Specifically, in the present example embodiment, the following substitute sets of natural language text are generated:

| Substitute Text Determined By Text Substitution Mod 310 | |
| --- | --- |
| Original Text | Substitute Text |
| quick | quick[synonym = fast] |
| jumps | jumps[synonym = leaps] |
| lazy | lazy[synonym = passive] |
| fox | fox[synonym = canine] |
| dog | dog[synonym = canine] |

Processing proceeds to step S270, where word embedding mod 315 generates one or more vector representations for the first set of natural language text utilizing the substitute set(s) of natural language text (that is, utilizing the metadata and its corresponding contextual information). Many known (or yet to be known) methods for generating vector representations from natural language text may be used. For example, in some embodiments, an artificial neural network, trained to generate vector representations (that is, word embeddings) generates the vector representation(s). Additionally, the vector representations may include vectors of varying sizes and complexities. For example, in some embodiments, the substitute sets of natural language text are represented by 2-dimension vectors. In other embodiments, the substitute sets of natural language text are represented by 100-dimension vectors. In still other embodiments, even thousands of dimensions (or more) may be used to represent the substitute sets of natural language text in a continuous vector space. In the present example embodiment, the following vectors are generated using a vector-generating algorithm (which will not be set forth in detail, but results in 2-dimension vectors with scalar values that are rounded to the nearest hundredth):

| 2-Dimensional Vectors Generated by Word Embedding Mod 315 | |
|---|---|
| Substitute Text | Vector Representation |
| quick[synonym = fast] | [12.00, 40.23] |
| jumps[synonym = leaps] | [1200, 5436.12] |
| lazy[synonym = passive] | [12.12, 60.78] |
| fox[synonym = canine] | [745.12, 92.31] |
| dog[synonym = canine] | [742.48, 91.64] |

In some embodiments, it may be desirable to generate vector representations for multiple words or groups of words in the first set of natural language text. It should be noted that vector representations may be generated, for example, by adding vector representations corresponding to subsets of the larger set of natural language text to be represented. For example, in one embodiment, generating a first vector representation for the first set of natural language text includes: (i) generating a first initial vector representation from a first subset of natural language text; (ii) generating a second initial vector representation from a second subset of natural language text; and (iii) adding the first initial vector representation and the second initial vector representation to generate the first vector representation. In another embodiment, a first vector representation for the first set of natural language text includes adding vectors corresponding to the original set of natural language text and the substitute set of natural language text. In this embodiment, generating the first vector representation for the first set of natural language text includes: (i) generating a first initial vector representation from the first set of natural language text; (ii) generating a second initial vector representation from the substitute set of natural language text; and (iii) adding the first initial vector representation and the second initial vector representation to generate the first vector representation.

Processing proceeds to step S275, where compare vectors mod 320 determines an amount of similarity between two sets of natural language text by comparing their respective vector representations. In some embodiments, the two sets being compared are the received first set of natural language text and a second set of natural language text. In other embodiments (including the present example embodiment), the two sets being compared are subsets of the first set of natural language text. Preferably (but not exclusively), the two vectors being compared are vectors that have both been generated using structure information (such as metadata and corresponding contextual information), but in some cases only one of the compared vectors (such as the vector generated for the received first set of natural language text) will have benefited from the inclusion of structure information in the vector generation process.

Many known (or yet to be known) methods for comparing vectors may be used by mod 320 to determine the amount of similarity. For example, in some embodiments, a cosine similarity measure is used to calculate similarity. In other embodiments, for example, subtraction is used to calculate the difference between corresponding scalar vector coordinates, where smaller differences represent similar words. However, this is not meant to be limiting, and the vector representations compared in step S275 may be compared utilizing a wide variety of known (or yet to be known) methods. Furthermore, the amount of similarity may be represented in a wide variety of known (or yet to be known) ways, such as by using similarity scores, similarity ratings, or the like.

In the present example embodiment, mod 320 determines the similarity between some of the individual words in the first set of natural language text by comparing their respective vector representations. The similarity determining rules for this example will not be set forth in detail, but some general results of the determined similarity are as follows: (i) the words "fox" and "dog" are determined to be very similar (as they share the same synonym of "canine"); (ii) the words "quick" and "lazy" are determined to be relatively similar, but not nearly as similar as "fox" and "dog" (as "quick" and "lazy" are both adjectives); and (iii) the word "jumps" is determined not to be particularly similar to "quick", "lazy", "fox" and/or "dog".

III. Further Comments and/or Embodiments

Embodiments of the present invention include a system and method for the generation of distributed word embeddings that use structure to provide context. In certain embodiments, structured information, such as semantics and syntax, including named entities, is used to build a context for words and/or phrases when representing them as vectors. This structure-aware training is more accurate than existing methods that use adjacent words (or the probability of adjacent words) to build vector representations.

Some embodiments of the present invention may include one, or more, of the following features, characteristics and/or advantages: (i) using structure (or "structural") information (such as dependency parsing information, named entity types, and semantic relations) as context in unsupervised learning of word embeddings; (ii) producing word embeddings with higher quality than general word-based methods; and (iii) generating word embeddings that contain more information than pure word strings.

Figure 4:
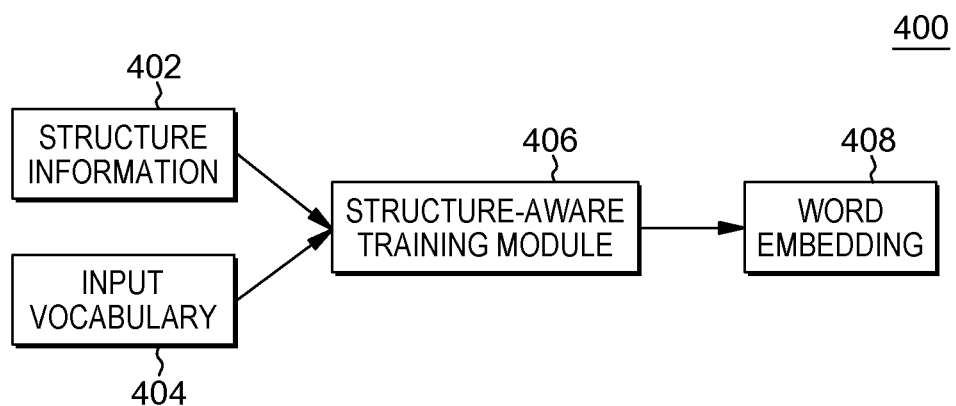
FIG. 4 is a block diagram showing a second embodiment of a system according to the present invention.

Diagram 400 (see FIG. 4) shows an example of a system (sometimes referred to as a "second embodiment system") according to an embodiment of the present invention. In this embodiment, structure information 402 and input vocabulary 404 are provided to structure-aware training module 406 as input. Structure-aware training module 406 uses the structure information as context to generate word embeddings 408 for the input vocabulary 404, where the word embeddings can be used to compare (or determine similarity between) words and/or phrases in a natural language processing (NLP) system. Structure information 402 may include, but is not limited to: (i) syntactic information, such as constituent parse trees and dependency parse trees; and/or (ii) semantic information, such as semantic relations and named entity types. For additional discussion of structure information, syntactic information, and semantic information, see: (i) the Example Embodiment sub-section of this Detailed Description; and (ii) the Definitions sub-section of this Detailed Description.

Input vocabulary 404 may be any natural language text for which word embeddings (that is, vector representations) are desired to be created. Or, stated another way, input vocabulary 404 represents the actual words and/or phrases for which word embeddings 408 are to be created.

Structure-aware training module 406 may be any computer module adapted to create word embeddings (such as word embeddings 408) from natural language text (such as input vocabulary 404) and structural or contextual information pertaining to that text (such as structure information 402). In some embodiments, structure-aware training module 406 includes an artificial neural network trained to generate word embeddings from input words and/or phrases. In other embodiments, structure-aware training module 406 includes a Skip-gram-based architecture or another similar training architecture known (or yet to be known) in the art.

Figure 5:
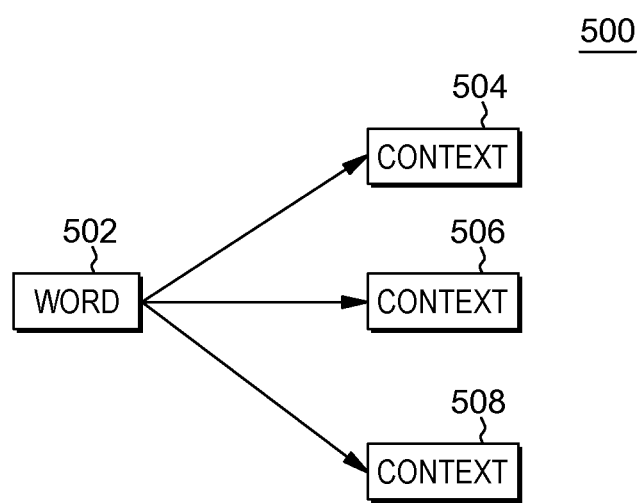
FIG. 5 is a diagram showing information that is helpful in understanding structured information according to the present invention.

Diagram 500 (see FIG. 5) shows an example of structured information according to the present invention. As shown in FIG. 5, for any given word and/or phrase (depicted as word 502) in input vocabulary 404, a plurality of structure information-based "contexts" (depicted as context 504, context 506, and context 508) may be determined. The contexts may include a wide variety of structure (or "structural") information relating to word 502, including, for example, the syntactic information and semantic information discussed above. In generating word embedding 408, structure-aware training module 406 may use context 504, context 506, and/or context 508, by themselves or in any combination. Furthermore, in some embodiments, word 502, context 504, context 506, and context 508 may each include their own pre-existing word embeddings, where the purpose of structure-aware training module 406 (see FIG. 4) is to simply decide whether to use context 504's word embedding, context 506's word embedding, or context 508's word embedding (or any combination thereof) to represent word 502.

Figures 6, 7:
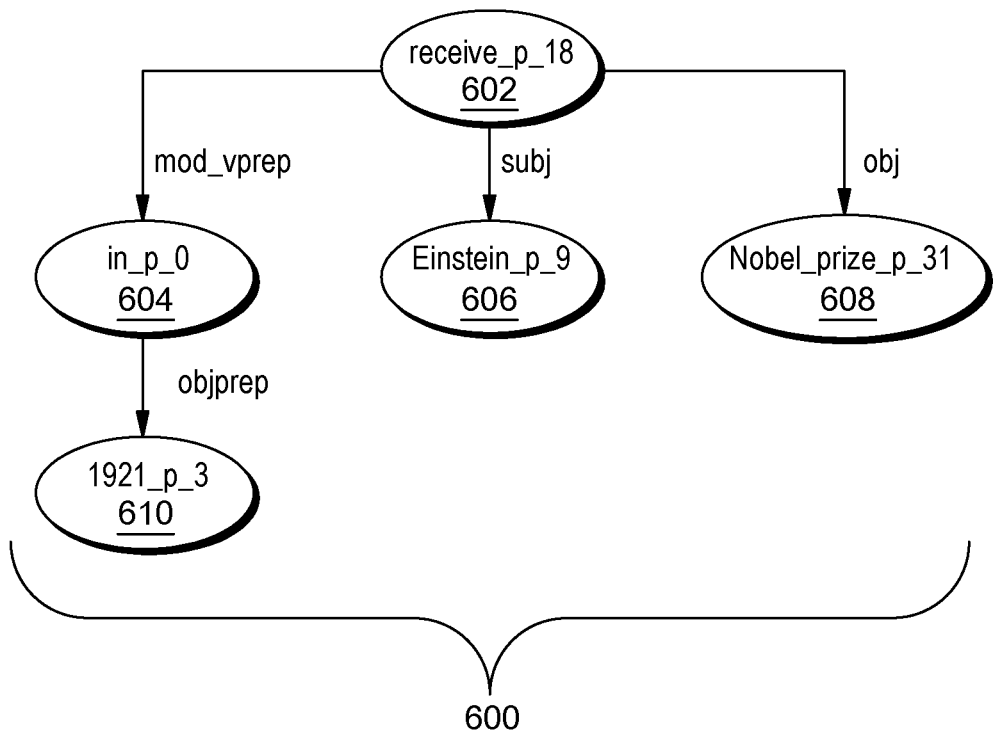
FIG. 6 is a tree diagram showing a dependency parse tree that is helpful in understanding syntactic information according to the present invention.
FIG. 7 is a table that is helpful in understanding context features according to the present invention.

Tree diagram 600 (see FIG. 6) shows a parse tree demonstrating syntactic information according to the present invention. More specifically, tree diagram 600 depicts a dependency parse tree for the following sentence (referred to as the "input sentence"): "In 1921, Einstein received the Nobel Prize." As shown in FIG. 6, the dependency parse tree (which represents syntactic information that may be located, for example, in structure information 402) includes the following nodes pertaining to the input sentence (where the set of word(s) at each node in the parse tree is depicted with the letter "p" and a number representing its respective position in the input sentence): node 602 ("receive_p_18"); node 604 ("in_p_0"); node 606 ("Einstein_p_9"); node 608 ("Nobel_prize_p_31"); and node 610 ("1921_p_3"). Tree diagram 600 also depicts the following relationships between nodes: node 610 is an object (denoted "objprep") of the preposition in node 604; node 604 is a preposition (denoted "mod_vprep") for the verb in node 602; node 606 is a subject (denoted "subj") for the verb in node 602; and node 608 is an object (denoted "obj") of the verb in node 602.

Table 700 (see FIG. 7) shows a table of context features that correspond to the words/phrases in the previously mentioned input sentence (and shown in FIG. 6). As shown in FIG. 7, column 702 depicts words and phrases in the input vocabulary (such as input vocabulary 404), and column 704 depicts context features corresponding to each of those words and phrases. As used herein, a context feature is a string of text that includes contextual (or structural) information pertaining to a word or phrase. More specifically, the context features in table 700 describe the relationships depicted in tree diagram 600. Specifically: (i) row R710 includes the word "receive" and the context feature "mod_vprep_in>1921"; (ii) row R720 includes the word "1921" and the context feature "mod_vprep_in<receive"; (iii) row R730 includes the word "receive" and the context feature "subj>Einstein"; (iv) row R740 includes the word "Einstein" and the context feature "subj<receive"; (v) row R750 includes the word "receive" and the context feature "obj>Nobel_prize"; and (vi) row R760 includes the word "Nobel_prize" and the context feature "obj<receive".

In some embodiments of the present invention, the context features depicted in column 704 (see FIG. 7) represent the text to be converted into vector representations for the words/phrases in column 702. Or, stated another way, in some embodiments, column 702 (see FIG. 7) represents input vocabulary 404 (see FIG. 4), tree diagram 600 (see FIG. 6) represents structure information 402 (see FIG. 4), and column 704 (see FIG. 7) represents word embeddings 408 (see FIG. 4). For example, in some of these embodiments, the vector representation for the word "receive" will be created from the context feature "mod_vprep_in>1921." In other embodiments, the vector representation for the word "receive" will be combined (for example, added) with the vector representation for the context feature "mod_vprerp_in>1921." In still other embodiments, the vector representation for the word "receive" includes the combination (for example, the addition) of the vector representations for all of the context features pertaining to the word "receive" (that is, "mod_vprep_in>1921" from row R710, "subj>Einstein" from row R730, and "obj>Nobel_prize" from row R750).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

Metadata: any data pertaining to other data, including, but not limited to, data describing other data, data providing structural information pertaining to other data, syntactic data, and/or semantic data.

Syntactic: relating to the structure of natural language phrases and sentences (that is, relating to grammar); some examples of syntactic relationships include, but are not limited to, constituent relationships (such as those depicted by constituent parse trees), dependency relationships (such as those depicted by dependency parse trees), parts of speech (for example, nouns, verbs, adjectives, adverbs, etc.), and/or grammatical tenses.

Semantic: relating to the meaning of natural language text; some examples of semantic relationships include, but are not limited to, relationships identified using named-entity recognition (for example, named entity types), relationships modeled/represented by semantic networks (such as semantic relations), synonyms, antonyms, and/or definitions.

What is claimed is:

1. A method for generating a vector representation of a set of natural language text in a natural language processing system, the method comprising:
   receiving, by the natural language processing system, a first set of natural language text and a set of information pertaining to the first set of natural language text, where the information includes a dependency parse tree including a root node and a plurality of nodes that depend from the root node, where the root node represents the first set of natural language text, and where the plurality of nodes that depend from the root node represent context features of the first set of natural language text;
   generating, by the natural language processing system, a first vector representation of the first set of natural language text, wherein the generating includes adding vector representations for the context features represented by the plurality of nodes that depend from the root node; and
   comparing, by the natural language processing system, the generated first vector representation to a second vector representation to determine, in the natural language processing system, an amount of similarity between the first set of natural language text and a second set of natural language text represented by the second vector representation.

2. The method of claim 1, wherein:
   the first set of natural language text is part of an input sentence; and
   the context features of the first set of natural language text represented by the plurality of nodes that depend from the root node correspond to words or phrases from the input sentence other than the first set of natural language text.

3. The method of claim 2, wherein:
   the context features of the first set of natural language text represented by the plurality of nodes that depend from the root node include: (i) the respective words or phrases to which the context features correspond, and (ii) contextual information indicating a relationship between the respective words or phrases and the first set of natural language text.

4. The method of claim 3, wherein:
   the first set of natural language text is a verb.

5. The method of claim 4, wherein:
   a first word or phrase corresponding to and included in a first context feature of the first set of natural language text is a subject of the verb; and
   the contextual information included in the first context feature indicates that the first word or phrase is a subject of the verb.

6. The method of claim 4, wherein:
   a first word or phrase corresponding to and included in a first context feature of the first set of natural language text is an object of the verb; and
   the contextual information included in the first context feature indicates that the first word or phrase is an object of the verb.

7. The method of claim 4, wherein:
   a first word or phrase corresponding to and included in a first context feature of the first set of natural language text is a prepositional phrase that modifies the verb; and
   the contextual information included in the first context feature indicates that the first word or phrase is a prepositional phrase that modifies the verb.

8. A computer program product for generating a vector representation of a set of natural language text in a natural language processing system, the computer program product comprising a computer readable storage medium having stored thereon:
   program instructions to receive, by the natural language processing system, a first set of natural language text and a set of information pertaining to the first set of natural language text, where the information includes a dependency parse tree including a root node and a plurality of nodes that depend from the root node, where the root node represents the first set of natural language text, and where the plurality of nodes that depend from the root node represent context features of the first set of natural language text;
   program instructions to generate, by the natural language processing system, a first vector representation of the first set of natural language text, wherein the generating includes adding vector representations for the context features represented by the plurality of nodes that depend from the root node; and
   program instructions to compare, by the natural language processing system, the generated first vector representation to a second vector representation to determine, in the natural language processing system, an amount of similarity between the first set of natural language text and a second set of natural language text represented by the second vector representation.

9. The computer program product of claim 8, wherein:
   the first set of natural language text is part of an input sentence; and
   the context features of the first set of natural language text represented by the plurality of nodes that depend from the root node correspond to words or phrases from the input sentence other than the first set of natural language text.

10. The computer program product of claim 9, wherein:
    the context features of the first set of natural language text represented by the plurality of nodes that depend from the root node include: (i) the respective words or phrases to which the context features correspond, and (ii) contextual information indicating a relationship between the respective words or phrases and the first set of natural language text.

11. The computer program product of claim 10, wherein:
    the first set of natural language text is a verb.

12. The computer program product of claim 11, wherein:
    a first word or phrase corresponding to and included in a first context feature of the first set of natural language text is a subject of the verb; and
    the contextual information included in the first context feature indicates that the first word or phrase is a subject of the verb.

13. The computer program product of claim 11, wherein:
a first word or phrase corresponding to and included in a first context feature of the first set of natural language text is an object of the verb; and
the contextual information included in the first context feature indicates that the first word or phrase is an object of the verb.

14. The computer program product of claim 11, wherein:
a first word or phrase corresponding to and included in a first context feature of the first set of natural language text is a prepositional phrase that modifies the verb; and
the contextual information included in the first context feature indicates that the first word or phrase is a prepositional phrase that modifies the verb.

15. A computer system for generating a vector representation of a set of natural language text in a natural language processing system, the computer system comprising:
a processor(s) set; and
a computer readable storage medium;
wherein:
the processor set is structured, located, connected and/or programmed to run program instructions stored on the computer readable storage medium; and
the program instructions include:
program instructions to receive, by the natural language processing system, a first set of natural language text and a set of information pertaining to the first set of natural language text, where the information includes a dependency parse tree including a root node and a plurality of nodes that depend from the root node, where the root node represents the first set of natural language text, and where the plurality of nodes that depend from the root node represent context features of the first set of natural language text;
program instructions to generate, by the natural language processing system, a first vector representation of the first set of natural language text, wherein the generating includes adding vector representations for the context features represented by the plurality of nodes that depend from the root node; and
program instructions to compare, by the natural language processing system, the generated first vector representation to a second vector representation to determine, in the natural language processing system, an amount of similarity between the first set of natural language text and a second set of natural language text represented by the second vector representation.

16. The computer system of claim 15, wherein:
the first set of natural language text is part of an input sentence; and
the context features of the first set of natural language text represented by the plurality of nodes that depend from the root node correspond to words or phrases from the input sentence other than the first set of natural language text.

17. The computer system of claim 16, wherein:
the context features of the first set of natural language text represented by the plurality of nodes that depend from the root node include: (i) the respective words or phrases to which the context features correspond, and (ii) contextual information indicating a relationship between the respective words or phrases and the first set of natural language text.

18. The computer system of claim 17, wherein:
the first set of natural language text is a verb;
a first word or phrase corresponding to and included in a first context feature of the first set of natural language text is a subject of the verb; and
the contextual information included in the first context feature indicates that the first word or phrase is a subject of the verb.

19. The computer system of claim 17, wherein:
the first set of natural language text is a verb;
a first word or phrase corresponding to and included in a first context feature of the first set of natural language text is an object of the verb; and
the contextual information included in the first context feature indicates that the first word or phrase is an object of the verb.

20. The computer system of claim 17, wherein:
the first set of natural language text is a verb;
a first word or phrase corresponding to and included in a first context feature of the first set of natural language text is a prepositional phrase that modifies the verb; and
the contextual information included in the first context feature indicates that the first word or phrase is a prepositional phrase that modifies the verb.

* * * * *